United States Patent [19]

Tamai et al.

[11] Patent Number: 5,506,064
[45] Date of Patent: Apr. 9, 1996

[54] MAGNETIC RECORDING MEDIUM

[75] Inventors: Kiminori Tamai; Takashi Handa, both of Saku, Japan

[73] Assignee: TDK Corporation, Tokyo, Japan

[21] Appl. No.: 381,090

[22] Filed: Jan. 31, 1995

Related U.S. Application Data

[63] Continuation of Ser. No. 946660, Sep. 18, 1992, abandoned.

[30] Foreign Application Priority Data

Sep. 24, 1991 [JP] Japan ................................ 3-272057

[51] Int. Cl.⁶ .................................. G11B 5/66; B32B 5/16
[52] U.S. Cl. .................... 428/694 B; 428/328; 428/408; 428/402; 428/403; 428/694 BA; 428/900; 427/128
[58] Field of Search ................................ 428/328, 408, 428/403, 402, 694 B, 694 BA, 900; 427/128

[56] References Cited

U.S. PATENT DOCUMENTS

| | | | |
|---|---|---|---|
| 4,075,384 | 2/1978 | Suzuki et al. | 478/212 |
| 4,506,000 | 3/1985 | Kubota et al. | 430/39 |
| 4,794,042 | 12/1988 | Kubota et al. | 428/328 |
| 5,225,281 | 7/1993 | Tamai et al. | 428/403 |

*Primary Examiner*—Leszek Kiliman
*Attorney, Agent, or Firm*—Oblon, Spivak, McClelland, Maier, & Neustadt

[57] ABSTRACT

Iron carbide particles are heat treated in a nitrogen atmosphere to form magnetic particles each comprising an iron base core and a carbon base surface. This magnetic particle powder having increased saturation magnetization σs is mixed with a binder to form a magnetic layer on a substrate, thus providing a magnetic recording medium which exhibits improved remanence Br and reproduces increased outputs.

6 Claims, 2 Drawing Sheets

5,506,064

MAGNETIC RECORDING MEDIUM

This application is a continuation of application Ser. No. 07/946,660, filed on Sep. 18, 1992, now abandoned.

This invention relates to a magnetic recording medium of the coating type.

BACKGROUND OF THE INVENTION

In the past, needle iron oxide was most commonly used among powder magnetic materials for magnetic recording media.

Magnetic recording media are currently required to have a higher signal recording density as represented by the widespread use of home VCRs and the development of high performance audio cassette tape, video tape, computer tape, magnetic disks, floppy disks, magnetic cards and the like. The requirement of higher density magnetic recording could not be met by the conventional needle iron oxide, and a variety of magnetic materials having higher coercivity and magnetic flux density have been developed.

One class of advanced magnetic powder materials includes metallic magnetic powders based on magnetic metals which have been commercially utilized in high performance audio cassette tape, video tape, DAT tape, magnetic disks and the like. It is still desired to further improve the output and S/N or C/N of magnetic recording media of the coating type using metallic magnetic powders. To this end, it is desired to increase the residual magnetic flux density, i.e. remanence Br of media, which in turn, requires to increase the saturation magnetization $\sigma s$ of magnetic powder.

SUMMARY OF THE INVENTION

Therefore, a primary object of the present invention is to increase the saturation magnetization $\sigma s$ of a metallic magnetic powder to thereby increase the remanence Br of a magnetic recording medium using the powder for eventually improving the output and S/N or C/N of the medium.

According to the present invention, there is provided a magnetic recording medium comprising a non-magnetic substrate and a magnetic layer thereon containing a magnetic powder and a binder. The magnetic powder is an aggregation of magnetic particles each comprising an iron base core and a carbon base surface. That is, the core of the magnetic particle contains iron as a major ingredient while the surface layer surrounding the core contains carbon as a major ingredient.

In one preferred embodiment, the magnetic particles are obtained by heat treating iron carbide particles in a non-oxidizing atmosphere. The core of the magnetic particle consists essentially of iron, more preferably α-iron. The magnetic powder contains carbon in an amount of 5 to 15% by weight.

With respect to magnetic properties, the magnetic powder preferably has a saturation magnetization $\sigma s$ of at least 140 emu/g. Then the medium has a remanence Br of at least 3,000 G.

The magnetic layer is formed by kneading the magnetic particles with an organic solvent, then dispersing in a binder to form a magnetic coating composition, and applying the magnetic coating composition to a non-magnetic substrate.

DETAILED DESCRIPTION OF THE INVENTION

Figure 1:
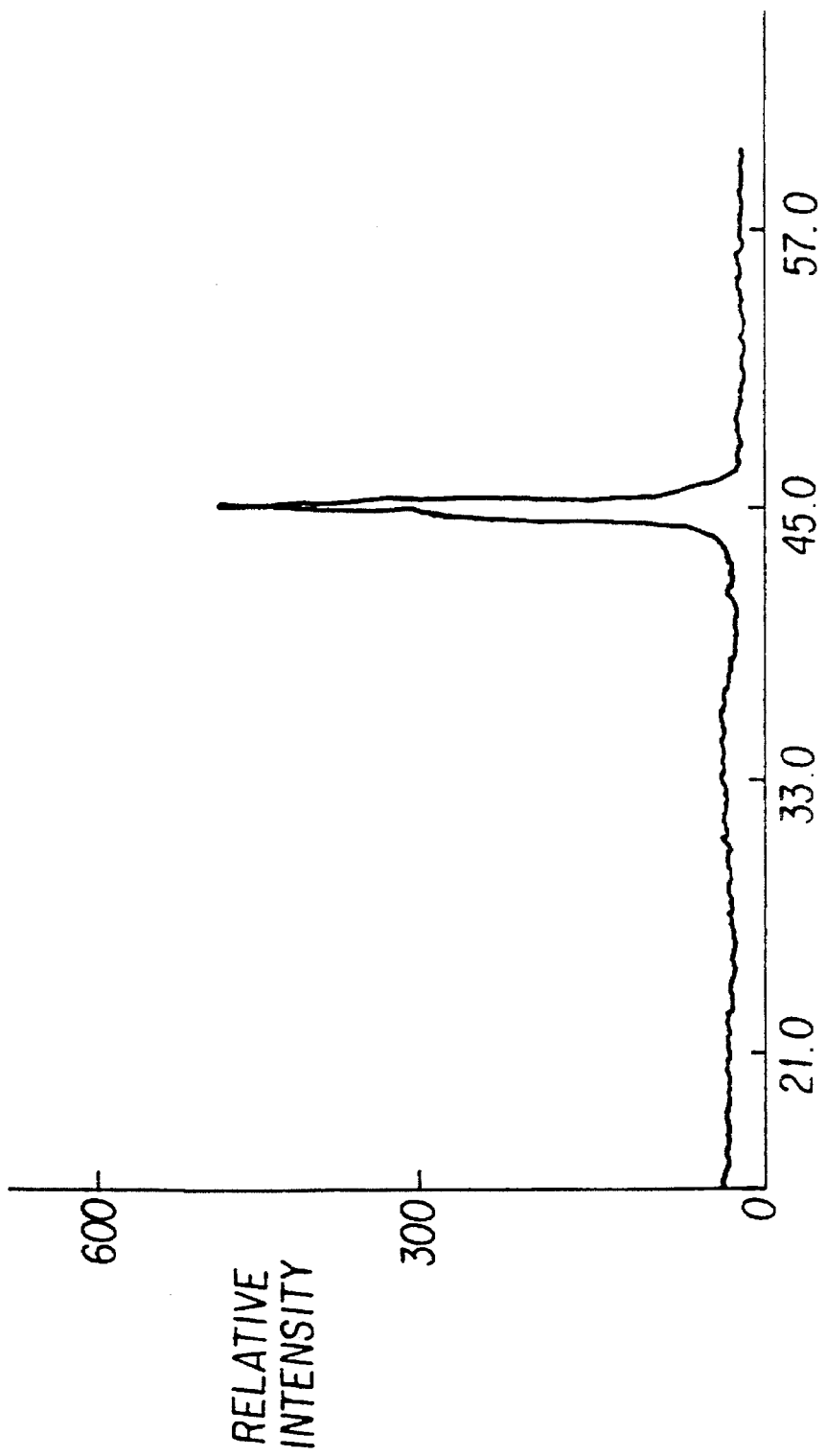
FIG. 1 is a diagram showing the X-ray diffraction pattern of a magnetic powder obtained in Example 1 according to the invention.

The magnetic recording medium of the present invention includes a non-magnetic substrate and a magnetic layer on at least one major surface thereof. The magnetic layer contains a magnetic powder and a binder. The magnetic powder is a loose aggregation of magnetic particles each having a core and a surface layer partially or entirely surrounding the core. The magnetic particle core contains iron as a major ingredient while the surface layer contains carbon as a major ingredient. Preferably, the core consists essentially of iron, especially α-iron.

In one preferred embodiment, the magnetic particles are obtained by heat treating iron carbide particles in a non-oxidizing atmosphere such as a non-oxidizing or inert gas stream of nitrogen or the like at a temperature of about 300° to 400° C. for about 12 to about 48 hours, yielding a black powder. The thus obtained magnetic powder exhibits an outstandingly high saturation magnetization $\sigma s$ and well maintains such magnetic properties with the lapse of time as compared with conventional metallic magnetic powders obtained by reducing iron oxide.

The starting material or iron carbide may be prepared by mixing an iron cyanide with a sulfate, sulfite or sulfide, placing the mixture in an iron-made reactor, and heat reducing the mixture while introducing carbon monoxide into the reactor, followed by cooling. It may also be prepared by starting with iron oxyhydroxides such as α-FeOOH (Goethite), β-FeOOH (Akaganite) and γ-FeOOH (Lepidocrocite), etc.; or iron oxides such as α-$Fe_2O_3$, γ-$Fe_2O_3$, $Fe_3O_4$, γ-$Fe_2O_3$-$Fe_3O_4$ (solid solution), etc.; and reducing the material with carbon monoxide or a gas mixture of hydrogen and carbon monoxide as disclosed in Japanese Patent Application Kokai Nos. 171765/1983 and 124023/1985. Alternatively, iron carbide may be prepared by reducing a slurry mixture of these iron oxides in an aqueous colloidal carbon black particle suspension with hydrogen, carbon monoxide or a mixture of hydrogen and carbon monoxide. Examples of the iron cyanides used herein include hexacyano iron salts such as Turnbull's blue, Berlin white, etc., and ferro- and ferricyanides such as potassium ferrocyanide, sodium ferrocyanide, potassium ferricyanide, sodium ferricyanide, etc. Examples of the additives include sulfates such as potassium sulfate, sodium sulfate, ammonium sulfate, iron sulfate, sodium hydrogen sulfate, and potassium hydrogen sulfate; sulfites such as potassium sulfite, sodium sulfite, ammonium sulfite, and potassium hydrogen sulfite; and sulfides such as sodium thiosulfate, potassium thiosulfate, sodium sulfide, potassium sulfide, iron sulfide, sodium rhodanide, potassium rhodanide, sodium isothiocyanate, and potassium isothiocyanate. The gas used in the heat reducing atmosphere is not limited to carbon monoxide (CO), and carbon-bearing reducing gases such as methane, water gas, and propane may also be used. For reduction purpose, a heating temperature of about 300° to 700° C. and a heating time of about 30 minutes to about 10 hours may be employed. Alternatively, pure iron particles may be subjected to any of the foregoing heat reducing treatments.

There are thus produced iron carbide particles represented by the formula $Fe_nC$ wherein n is a number of at least 2, particularly from 2 to 3. Although it is not necessary that n be an integer or the material have a stoichiometric composition, there are often formed $Fe_2C$, $Fe_5C_2$, and $Fe_3C$. There may occur a somewhat graded concentration in particles.

Such iron carbide particles are then heat treated as previously defined to produce magnetic particles having a carbon base surface cover and an iron, especially α-iron, base core. The presence of carbon at the surface can be analyzed by secondary ion mass spectroscopy (SIMS) to detect a C—C bond. The presence of α-iron can be analyzed by X-ray diffractometry (XRD).

Preferably, the magnetic powder contains about 5 to 15% by weight of carbon with the balance of essentially α-iron because this composition ensures very high σs. Too low carbon contents lead to poor retention of magnetic properties with time whereas σs is low with too high carbon contents.

The magnetic powder is composed of particles in needle or granular form. The dimensions of particles may be suitably selected in accordance with the intended application of the magnetic recording medium. For general purposes, particles having a major diameter or length of 0.1 to 1 μm and an aspect ratio (length/breadth) of from 1 to 20 are used. When it is intended to prepare a magnetic tape of the video or audio tape specification, needle particles are preferably employed, particularly those particles having a length of 0.1 to 0.5 μm and a needle ratio (length/breadth) of from 4 to 15. Also preferably, the magnetic powder has a specific surface area of about 20 to 70 $m^2/g$ as measured by BET based on nitrogen adsorption.

With respect to magnetic properties, the magnetic powder preferably has a coercivity Hc of 1,000 to 1,800 Oe, more preferably 1,200 to 1,600 Oe and a saturation magnetization σs of at least 140 emu/g, more preferably 150 to 170 emu/g.

In the practice of the present invention, a magnetic coating composition is prepared from such a magnetic powder predominantly comprising iron, preferably through pretreatment thereof by kneading the magnetic powder with one or more organic solvents for dispersion. This pretreatment is effective for eliminating agglomeration of the magnetic powder and improving the dispersibility thereof in a binder, thus ensuring formation of a magnetic layer featuring a high degree of filling and orientation.

The organic solvent used herein is not particularly limited and may be selected from solvents commonly used for conventional magnetic coating paints. Examples include ketones such as cyclohexanone, methyl ethyl ketone, methyl isobutyl ketone, and isophorone; aromatics such as toluene; alcohols such as isopropyl alcohol and butyl alcohol; and cellosolves such as ethyl cellosolve and cellosolve acetate, and mixtures thereof. Among others, ketone and aromatic solvents are more effective, with cyclohexanone, methyl ethyl ketone, methyl isobutyl ketone, and toluene being most advantageous. A mixture of two or more ketone and/or aromatic solvents is acceptable.

In the pretreatment step, about 20 to 50 parts by weight of the organic solvent is mixed with 100 parts by weight of the magnetic powder. Higher proportions of the organic solvent would allow some agglomerates to remain after kneading whereas lower proportions would cause particles to be fractured during kneading. The pretreatment step takes about 15 minutes to 12 hours for kneading.

The magnetic powder defined herein should preferably occupy about 50 to 100% by weight of the entire magnetic powder used to prepare a magnetic coating composition. Differently stated, another magnetic powder may be used in combination with the inventive magnetic powder. The additional magnetic powder which can be used herein includes conventional ones, for example, oxide fine powders such as γ-$Fe_2O_3$, cobalt-containing γ-$Fe_2O_3$, $Fe_3O_4$, cobalt-containing $Fe_3O_4$, $CrO_2$, barium ferrite, and strontium ferrite, and metallic magnetic powders such as Fe, Co and Ni or alloys thereof.

The organic solvent dispersion of magnetic powder is then combined with a binder and agitated until a uniform dispersion is obtained. The binders which can be used herein include electron radiation curable resins, thermoplastic resins, thermosetting resins, and reactive resins, and mixtures thereof. The thermosetting resins and electron radiation curable resins are preferred because of the strength of the resultant coatings.

Some illustrative non-limiting examples of the thermosetting resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/ high molecular weight diol/triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer (which may have carboxylic units incorporated therein), a vinyl chloride-vinyl alcohol-vinyl acetate copolymer (which may have carboxylic units incorporated therein), a vinyl chloride-vinylidene chloride copolymer, chlorinated polyvinyl chloride, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadiene-acrylonitrile, etc.; and mixtures of any of the foregoing members.

The crosslinking agents which can be used to cure these binder resins include various polyisocyanates, preferably diisocyanates such as tolylene diisocyanate, hexamethylene diisocyanate and methylene diisocyanate. These crosslinking agents are reactive with functional groups of the binder resins, thereby causing crosslinking of the binder resins. Usually about 10 to 30 parts by weight of the crosslinking agent is used per 100 parts by weight of the resin. These thermosetting resins are generally cured by heating in an oven at about 50° to 70° C. for about 12 to 48 hours.

Among the preferred binders are electron radiation-curable resins, that is, resins obtained by partially curing electron radiation-curable compounds. Illustrative electron radiation-curable resins are thermoplastic resins having contained or incorporated in their molecule groups capable of crosslinking or polymerizing upon exposure to electron radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to electron radiation may also be used. The thermoplastic resins which can be modified into electron radiation-curable resins include, for example, vinyl chloride copolymers, vinyl chloride-vinyl acetate copolymers, vinyl alcohol copolymers, vinyl chloride-acrylic copolymers, epoxy resins of saturated polyesters, phenoxy resins, and cellulosic resins. They may be acryl modified in a conventional manner.

The solvent for the magnetic coating composition is not particularly limited and may be selected from solvents commonly used for conventional magnetic coating paints. Examples include ketones such as cyclohexanone, methyl ethyl ketone, methyl isobutyl ketone, and isophorone; aromatics such as toluene; alcohols such as isopropyl alcohol and butyl alcohol; and cellosolves such as ethyl cellosolve and cellosolve acetate, and mixtures thereof. The amount of the solvent used in the magnetic coating composition is not particularly limited although about 150 to 250 parts by weight of the organic solvent is generally mixed with 100 parts by weight of the magnetic powder.

Organic fine particles such as $\alpha$-$Al_2O_3$, $Cr_2O_3$, $TiO_2$, SiC and $\alpha$-$Fe_2O_3$ may be added to the magnetic coating composition for enhancing the mechanical strength of a magnetic layer formed therefrom. If desired, the magnetic coating composition may further contain various other additives including dispersants such as fatty acids and lubricants such as silicone oil.

The magnetic coating composition is applied to a non-magnetic substrate. After the organic solvent is evaporated off, a magnetic layer is formed on the substrate. The magnetic layer typically has a thickness of about 2 to 4 μm. The substrate may be any of conventional well-known ones which are non-magnetic. If desired, an undercoat layer, a backcoat layer or the like may be applied to the substrate.

With the use of the magnetic powder defined herein, the magnetic layer can have a remanence Br of at least 3,000 G and a coercivity Hc of about 1,200 to 1,700 Oe and retain such magnetic properties intact over an expected long service period.

EXAMPLE

Examples of the present invention are given below by way of illustration and not by way of limitation.

Example 1

Preparation of Iron Carbide

A porcelain-made boat was charged with 50 grams of $Fe_3O_4$ needles having an average length of 0.20 μm and an average aspect ratio (length/breadth) of 10. The boat was placed in a heating oven into which nitrogen gas was introduced to purge air. Thereafter, the oven was heated to 350° C. and maintained at the temperature. At this point, a gas mixture of CO and $H_2$ in a volume ratio of 30:70 was passed through the oven at a flow rate of 300 ml/min. The needles were heat treated for 12 hours in this way.

Figure 2:
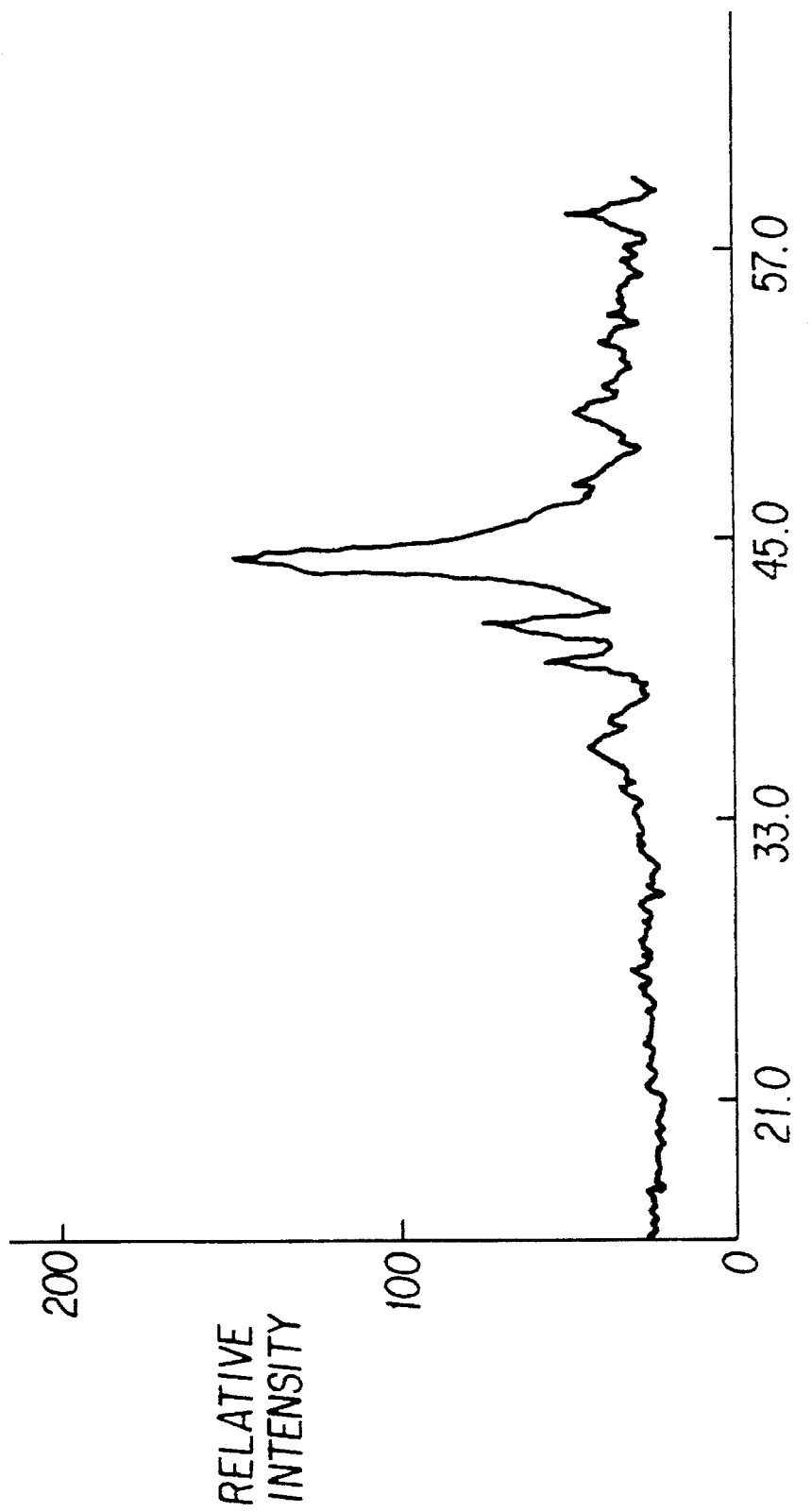
FIG. 2 is a diagram showing the X-ray diffraction pattern of an iron carbide powder from which the magnetic powder was prepared in Example 1.

Then the oven was allowed to cool down to room temperature, obtaining a black powder. By X-ray diffractometry, this black powder was identified to be essentially $Fe_5C_2$. The X-ray diffraction pattern of the black powder is shown in FIG. 2.

Preparation of Magnetic Powder

A porcelain-made boat was charged with 30 grams of the $Fe_5C_2$ powder prepared above. The boat was placed in a heating oven into which nitrogen gas was introduced to purge air. Thereafter, the oven was heated to 380° C. and maintained at the temperature. At this point, nitrogen gas was passed through the oven at a flow rate of 100 ml/min. The powder was heat treated for 24 hours in this way.

Then the oven was allowed to cool down to room temperature, obtaining a black powder. This magnetic powder, designated sample No. 1, was analyzed by X-ray diffractometry (Cu target, 40 kV, 30 mA). The X-ray diffraction pattern of the powder is shown in FIG. 1. The pattern of FIG. 1 shows that a peak attributable to $Fe_5C_2$ substantially disappeared and a peak attributable to $\alpha$-iron newly developed. There was found no peak attributable to iron carbide other than $Fe_5C_2$. SIMS analysis detected a C—C bond which showed the presence of carbon at the surface of powder particles. The surface layer of carbon had a thickness of about 15 Å. The particles had an average length of 0.20 μm and an average aspect ratio of 10.

This magnetic powder, sample No. 1, had a coercivity Hc of 1550 Oe, a saturation magnetization σs of 155 emu/g, and a BET value of 55 $m^2$/g. It contained 10% by weight of carbon. Sample No. 1 was stored for 7 days in an oven at 60° C. for examining the retention of magnetic properties with the lapse of time. The results are shown in Table 1.

TABLE 1

| Sample No. | | Hc (Oe) | σs (emu/g) | BET ($m^2$/g) | ΔHc (%) | Δσs (%) |
|---|---|---|---|---|---|---|
| 1 | initial | 1550 | 155 | 55 | — | — |
| (invention) | aged | 1535 | 138 | — | −1.0 | 11 |
| 2 | initial | 1610 | 120 | 58 | — | — |
| (comparison) | aged | 1565 | 102 | — | −2.8 | 15 |

Pretreatment

The thus obtained magnetic powder sample No. 1, 20 grams, was admitted into a steel-made ball mill having an interior volume of 140 ml and charged with 300 grams of steel balls with a diameter of 3 mm. A 1/1 mixture of methyl ethyl ketone and cyclohexanone, 6 grams, was added to the vibratory dispersing mill which was operated for one hour at 30° C. to knead the contents for dispersion.

Preparation of Magnetic Coating Composition

A magnetic coating composition was prepared from the following ingredients.

| Ingredients | Parts by weight |
|---|---|
| Magnetic powder | 100 |
| Vinyl chloride-vinyl acetate copolymer (degree of polymerization ~300) | 14 |
| Polyurethane resin (number average molecular weight ~40,000) | 6 |
| $\alpha$-$Al_2O_3$ | 3 |
| Stearic acid | 1 |
| Methyl ethyl ketone | 80 |
| Toluene | 80 |
| Cyclohexanone | 40 |

The ingredients were thoroughly kneaded in a pressure kneader and then dispersed in a sand grinder mill. To the composition was added 4 parts by weight of tolylene diisocyanate. The composition was applied to a polyester film of 10 μm thick and dried under an orienting magnetic field of 2,000 G. The coating was calendered and then thermoset at 60° C. for 24 hours. The coating eventually gave a magnetic layer of 3.0 μm thick. The coated film was slit to a width of 8 mm by means of a slitter, obtaining a length of 8-mm video tape which is designated sample No. 11.

Using a vibrating sample magnetometer (VSM), sample No. 11 was measured for remanence Br, coercivity Hc and squareness ratio Br/Bm. As a measure for evaluating a degree of orientation (OR), the ratio of the squareness ratio in a longitudinal direction to the squareness ratio in a transverse direction of the tape was determined. For evaluating electromagnetic properties, RF reproduction outputs at 7 MHz and 750 kHz were measured. The results are shown in Table 2.

TABLE 2

| Sample No. | Hc (Oe) | Br (G) | Br/Bm | OR | RF output (dB) 7 MHz | RF output (dB) 750 kHz |
|---|---|---|---|---|---|---|
| 11 (invention) | 1520 | 3350 | 0.780 | 1.82 | 1.0 | 2.5 |
| 12 (invention) | 1525 | 3370 | 0.782 | 1.85 | 1.1 | 2.7 |
| 21 (comparison) | 1530 | 2490 | 0.810 | 2.02 | 0 | 0 |

Example 2

Tape sample No. 12 was prepared by the same procedure as in Example 1 except that the solvent used in the pretreatment step was changed to methyl ethyl ketone. The results are shown in Table 2.

Comparative Example

An iron powder was prepared from the same $Fe_3O_4$ needles as used in the preparation of iron carbide in Example 1 by using 50 grams of $Fe_3O_4$ needles, changing the holding temperature to 450° C., passing $H_2$ gas instead of the $CO/H_2$ gas at a flow rate of 1,000 ml/min., and effecting heat treatment for 6 hours, followed by cooling. The iron powder was immersed in a toluene solution for 10 minutes while blowing air for air drying purpose. A comparative magnetic powder sample No. 2 was obtained in this way.

A tape sample No. 21 was prepared as in Example 1 except that the magnetic powder was replaced by sample No. 2.

The results are shown in Tables 1 and 2.

As is evident from Tables 1 and 2, the magnetic recording media of the present invention are significantly improved in remanence Br and hence, in electromagnetic properties.

There has been described a magnetic recording medium using a magnetic powder having a high saturation magnetization σs, which ensures that the medium has improved remanence Br and reproduces substantially increased outputs.

I claim:

1. A magnetic recording medium comprising a non-magnetic substrate and a magnetic layer thereon containing magnetic particles and a binder, the magnetic particles each comprising an iron base core and a carbon base surface layer consisting essentially of non-carbide form inorganic carbon, wherein carbon is contained in an amount of 5 to 15% by weight of the magnetic particles.

2. The magnetic recording medium of claim 1 wherein the core of the magnetic particle consists essentially of α-iron.

3. The magnetic recording medium of claim 1 wherein said magnetic particles have a saturation magnetization σs of at least 140 emu/g.

4. The magnetic recording medium of claim 1 wherein said medium has a remanence Br of at least 3,000 G.

5. The magnetic recording medium of claim 1 wherein said magnetic layer is formed by kneading the magnetic particles with an organic solvent, then dispersing in the binder to form a magnetic coating composition, and applying the magnetic coating composition to the non-magnetic substrate.

6. The magnetic recording medium of claim 1, wherein said non-carbide form inorganic carbon contains a C—C bond.

\* \* \* \* \*